Figure 27:
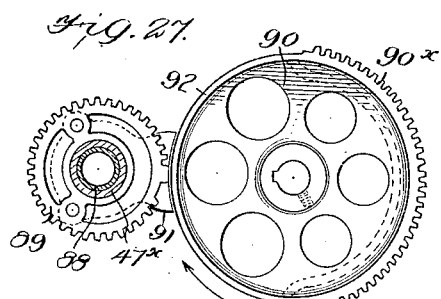

C. F. THOMAS.
BRICK SURFACING MACHINE.
APPLICATION FILED MAR. 31, 1913.
1,131,441.
Patented Mar. 9, 1915.
10 SHEETS—SHEET 1.
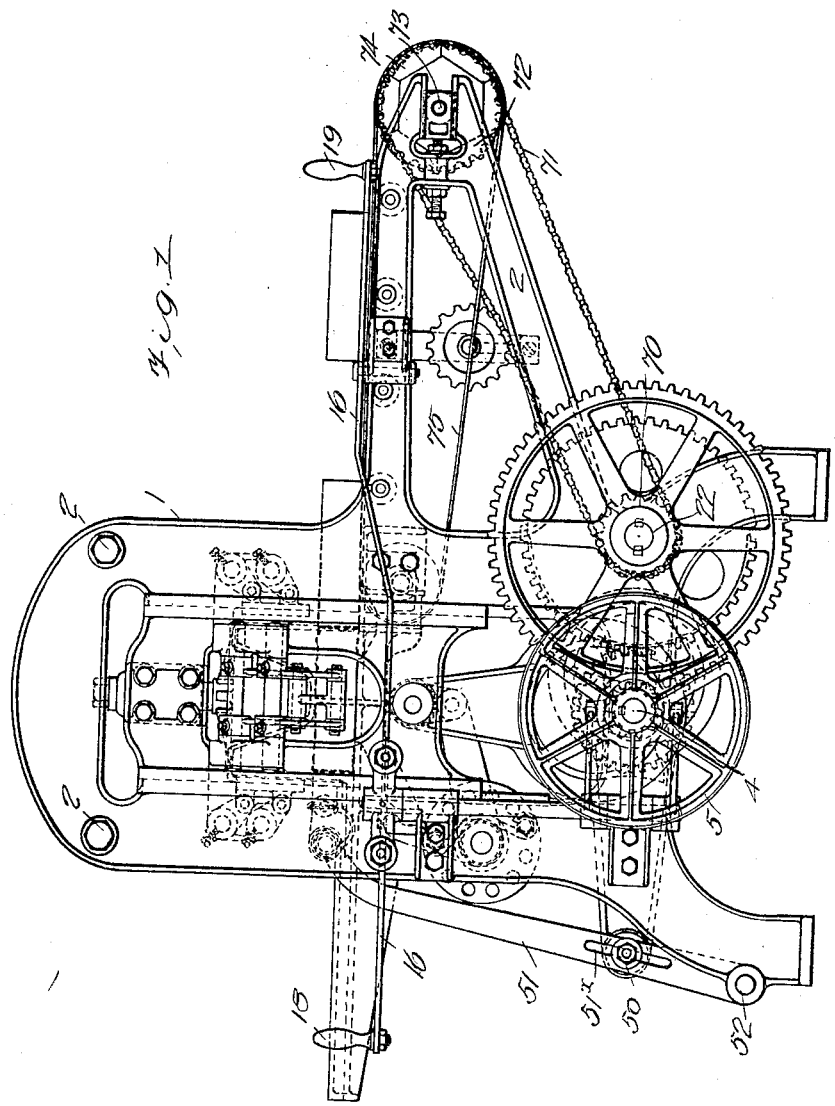
Witnesses:
F. C. Barry
L. A. Stanley
Inventor
Charles F. Thomas
By Attorneys Munn & Co.

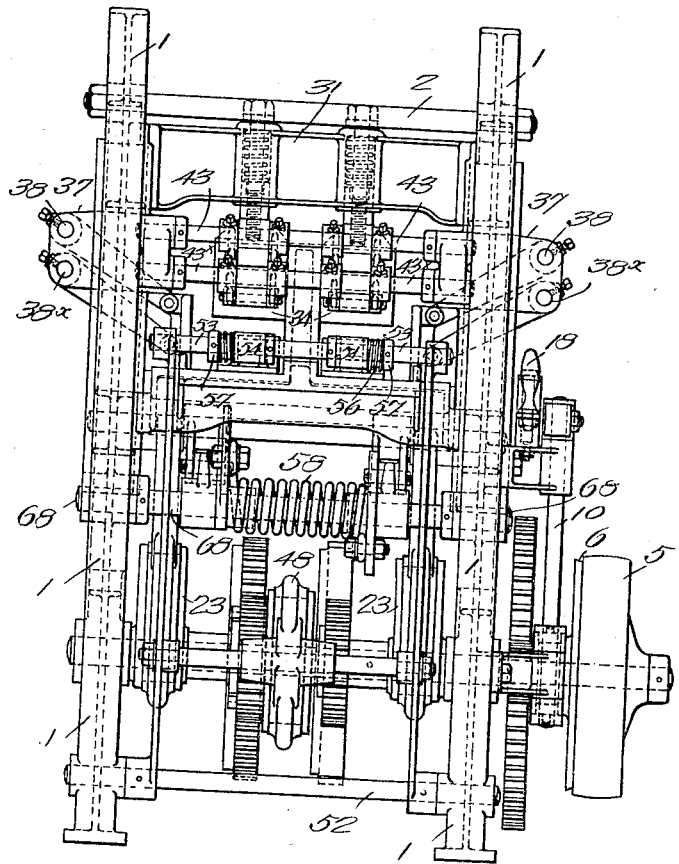

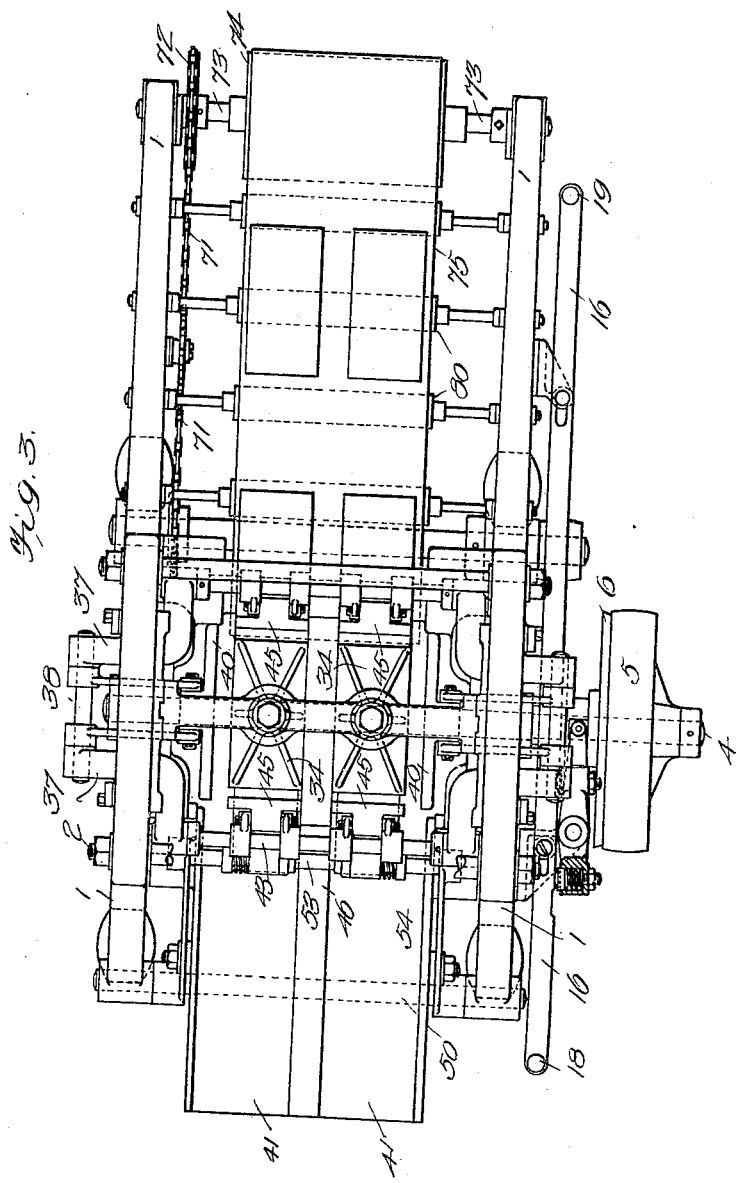

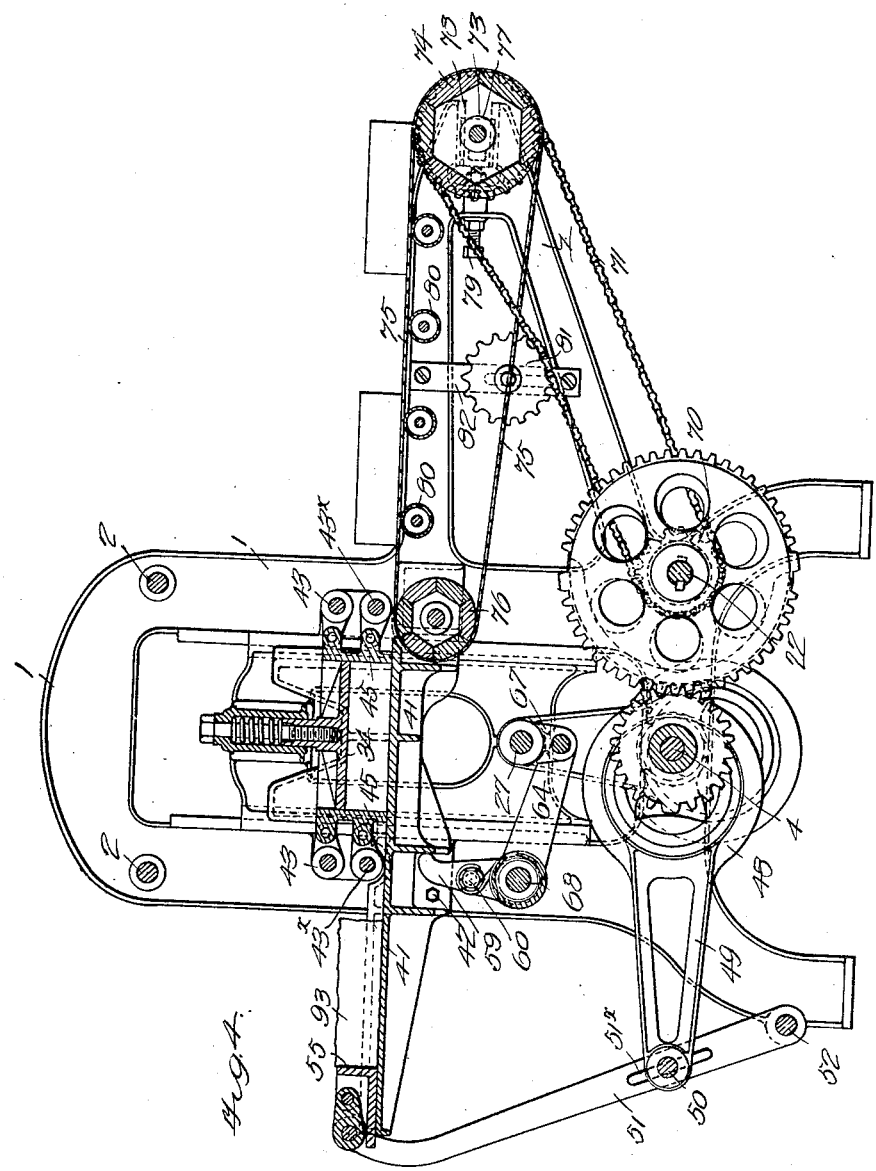

C. F. THOMAS.
BRICK SURFACING MACHINE.
APPLICATION FILED MAR. 31, 1913.

1,131,441.

Patented Mar. 9, 1915.
10 SHEETS—SHEET 5.

Witnesses:
F. C. Barry
L. A. Stanley

Inventor
Charles F. Thomas
By Attorneys Munn & Co.

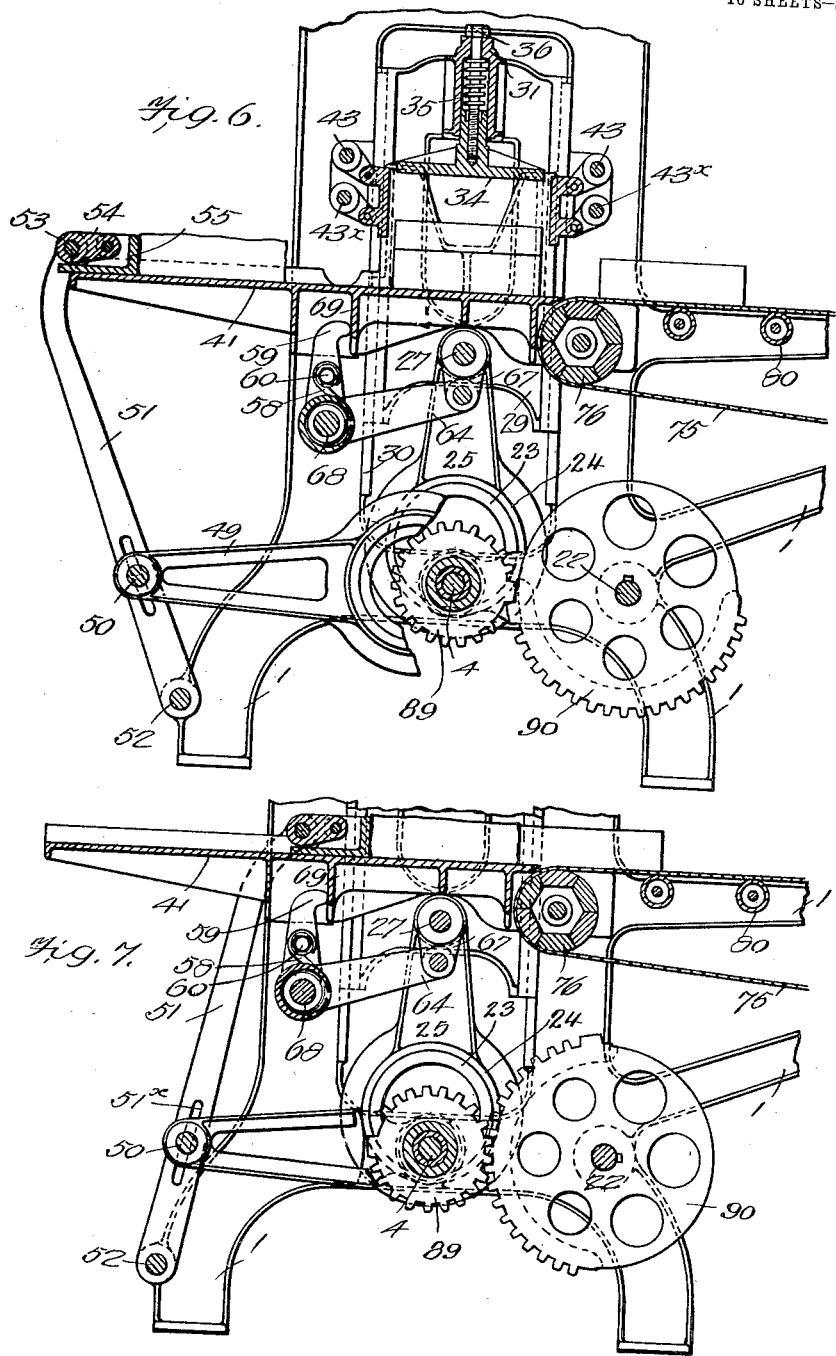

C. F. THOMAS.
BRICK SURFACING MACHINE.
APPLICATION FILED MAR. 31, 1913.
1,131,441.
Patented Mar. 9, 1915.
10 SHEETS—SHEET 7.
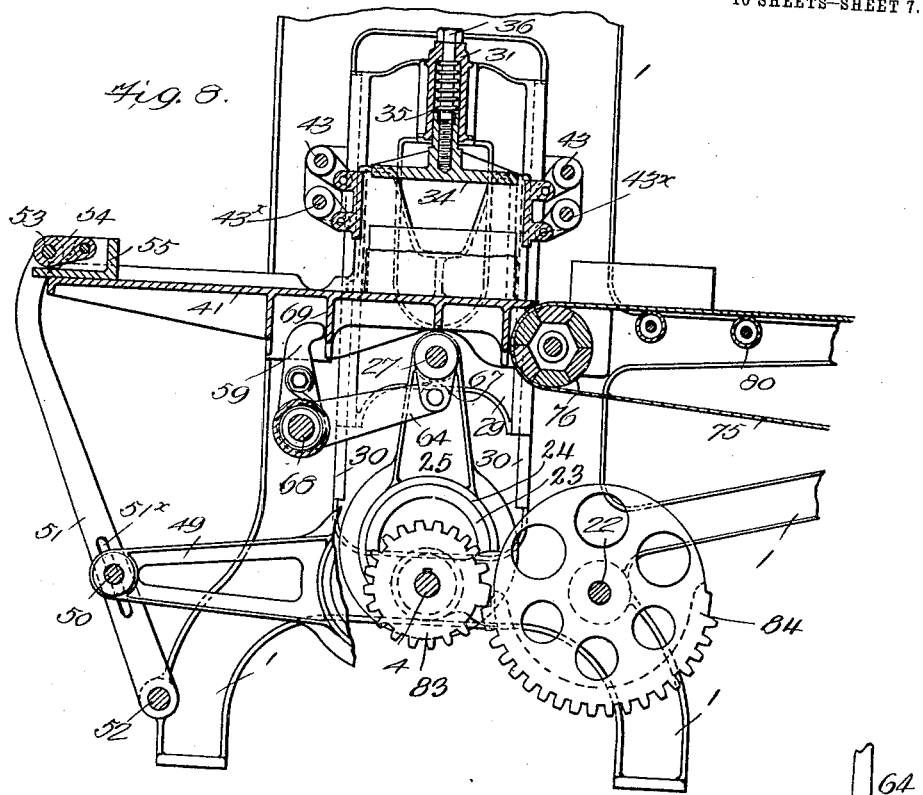
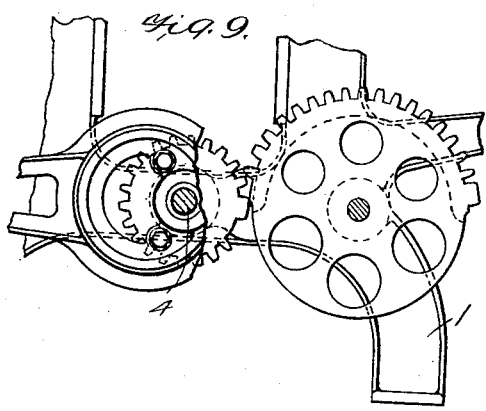
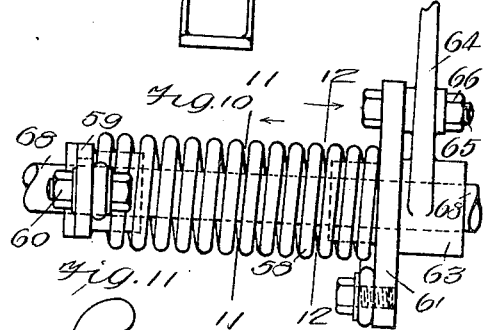
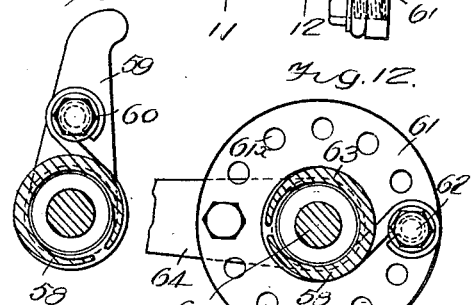
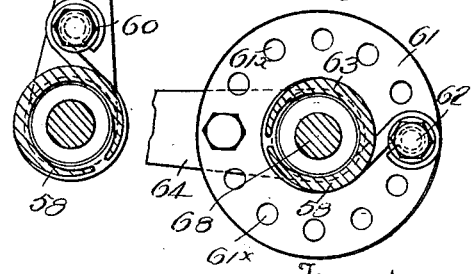
Inventor
Charles F. Thomas

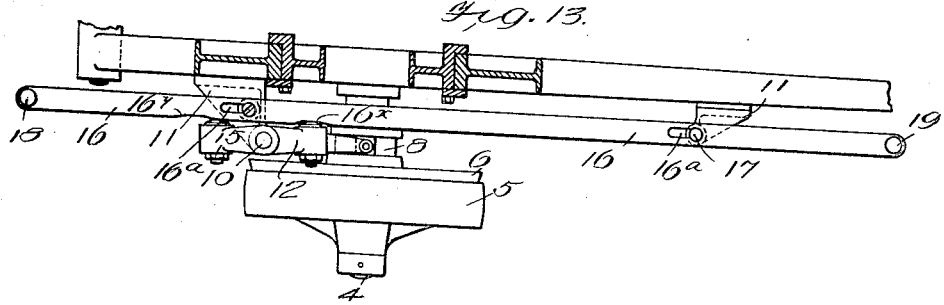
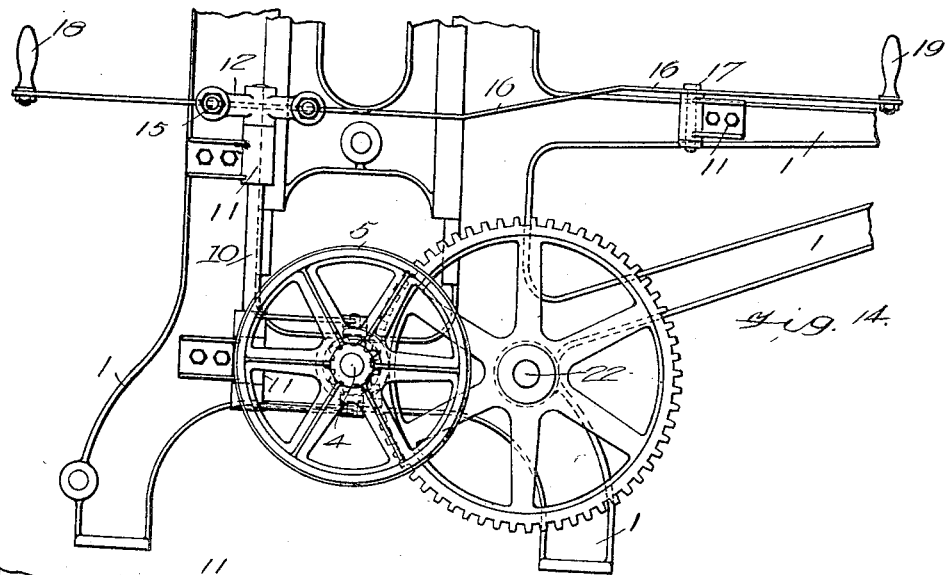
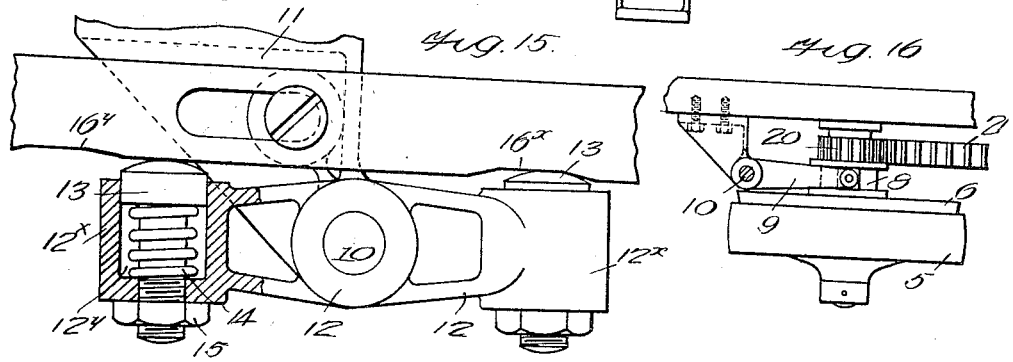

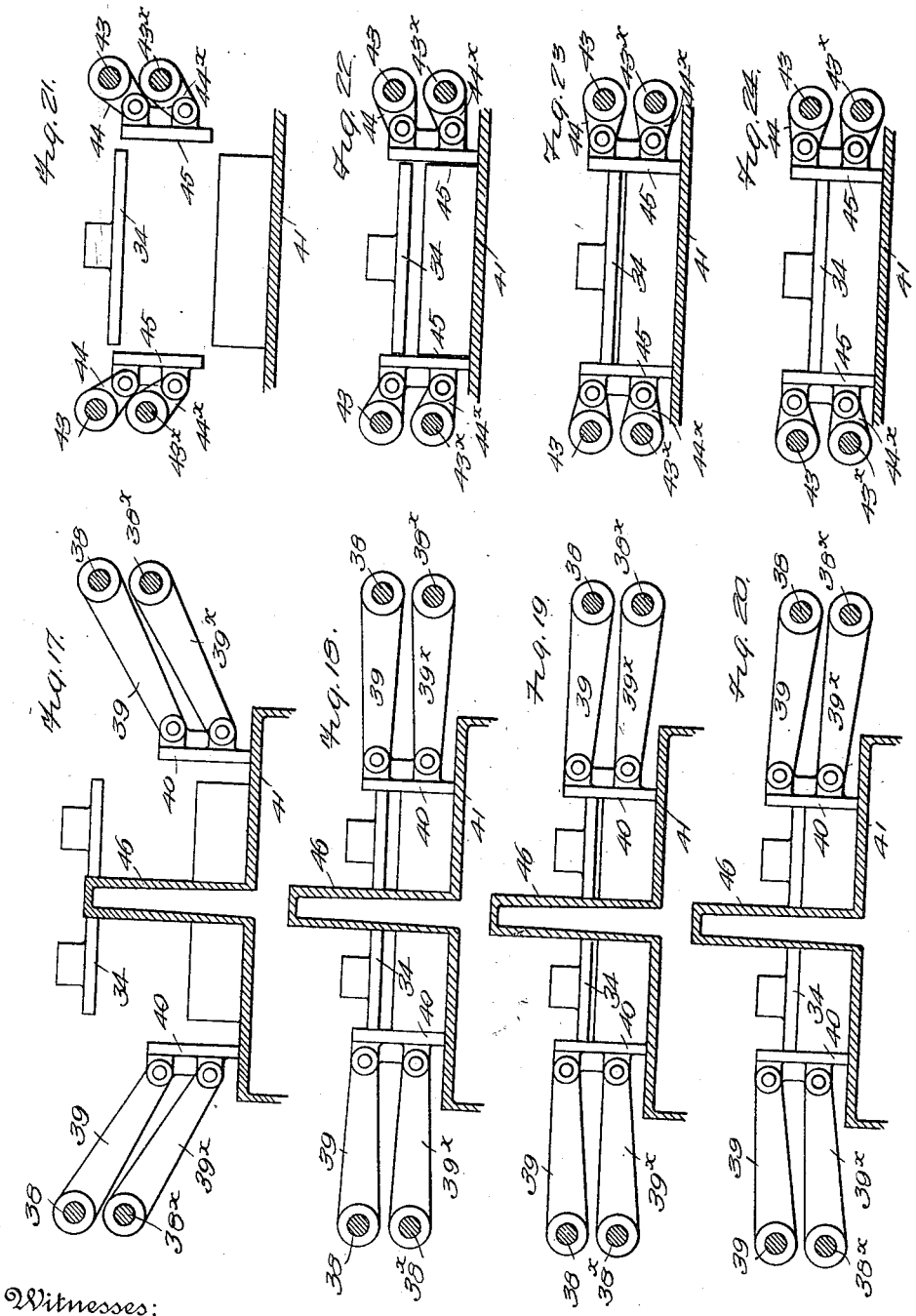

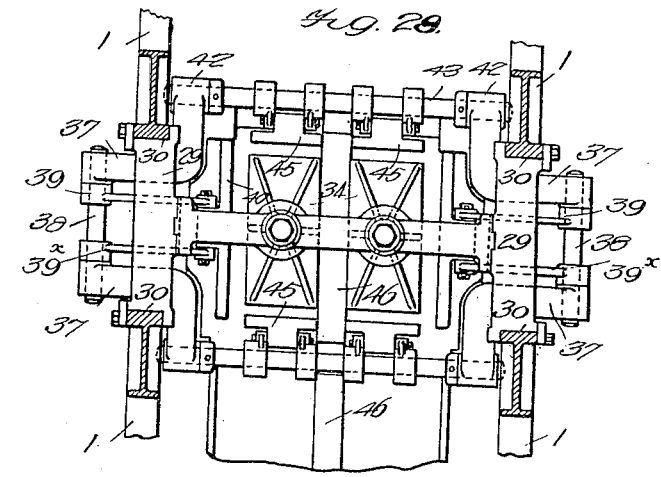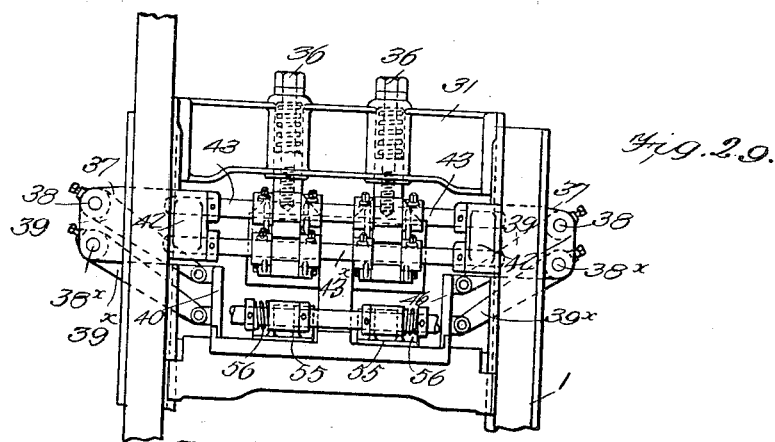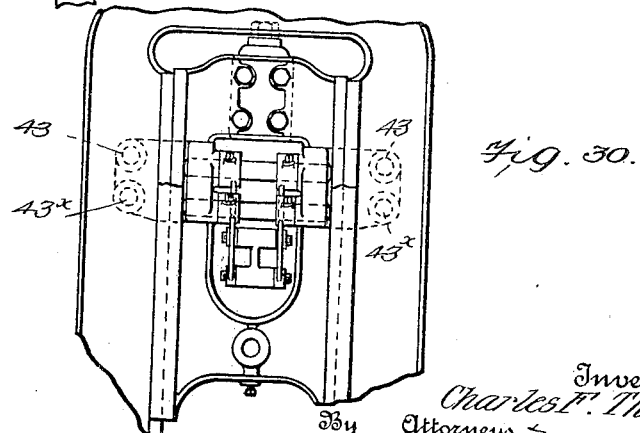

UNITED STATES PATENT OFFICE.

CHARLES F. THOMAS, OF BUCKEYSTOWN, MARYLAND.

BRICK-SURFACING MACHINE.

1,131,441.  Specification of Letters Patent.  Patented Mar. 9, 1915.

Application filed March 31, 1913. Serial No. 757,897.

*To all whom it may concern:*

Be it known that I, CHARLES F. THOMAS, a citizen of the United States, and a resident of Buckeystown, in the county of Frederick and State of Maryland, have made certain new and useful Improvements in Brick-Surfacing Machines, of which the following is a specification.

My invention relates to improvements in devices for surfacing and pressing brick, and it consists in the combinations, constructions, and arrangements herein described and claimed.

The primary object of my invention is to provide a device which will press a brick so as to leave the surface in a perfectly smooth condition, and which will deliver the brick thus surfaced.

A further object of my invention is to provide novel means for first applying pressure upon the sides of the brick, then upon the ends, and finally upon the top and bottom.

A further object of my invention is to provide a device for accomplishing the above named objects which is of relatively small size and simple, but positive in operation.

Other objects and advantages will appear in the following specification, and the novel features of the device will be particularly pointed out in the appended claims.

My invention is illustrated in the accompanying drawings forming part of this application in which similar reference characters indicate like parts in the several views and in which—

Figure 26:
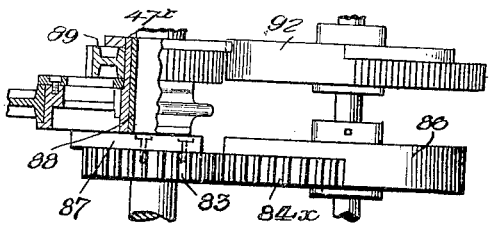
Figure 5:
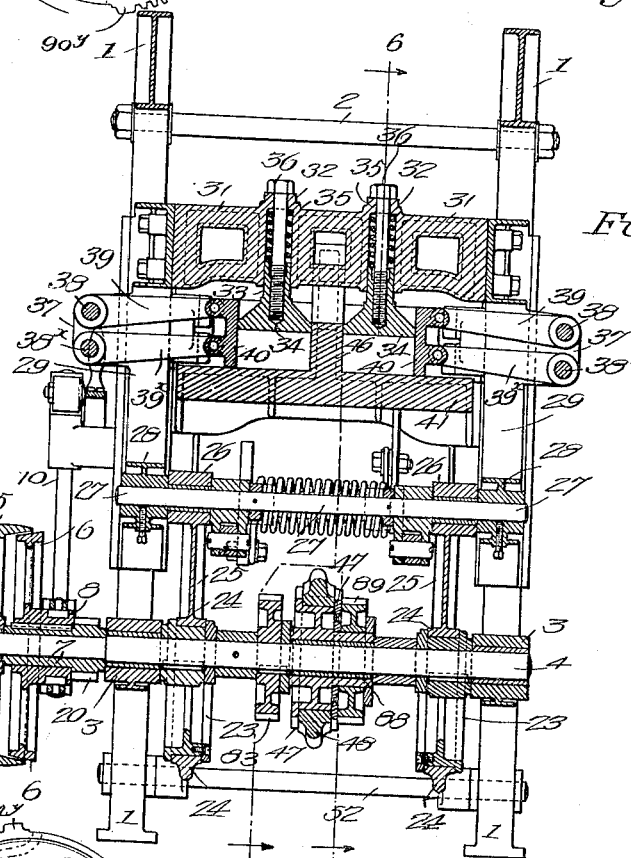
Figure 25:
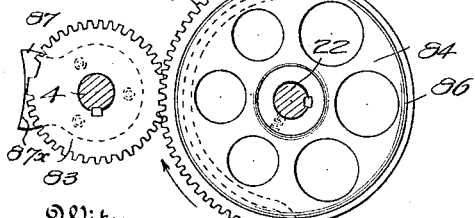

Figure 1 is a side elevation of the machine, Fig. 2 is an end elevation looking into the machine from the feeding end, Fig. 3 is a plan view of the machine, Fig. 4 is a longitudinal section through the machine, Fig. 5 is a transverse section through the machine with the parts in pressing position, Fig. 6 is a section through the device along the line 6—6 of Fig. 5, Fig. 7 is a cut away view similar to Fig. 6 showing the mechanism in its shifted position, Fig. 8 is a view somewhat similar to Fig. 6, but along the line 6—8 of Fig. 5 and showing the mechanism in another position, Fig. 9 is a view of a portion of the feed actuating mechanism when the presser actuating mechanism is in the position shown in Fig. 8, Fig. 10 is a plan view of a spring for counter-balancing the weight of the presser plates, Fig. 11 is a section along the line 11—11 of Fig. 10, looking in the direction of the arrows, Fig. 12 is a section on the line 12—12 of Fig. 10, looking in the direction of the arrows, Fig. 13 is a plan view of the clutch actuating mechanism, certain parts being shown in section, Fig. 14 is a side elevation, showing the clutch actuating mechanism, Fig. 15 is a detail part of the clutch actuating mechanism, Fig. 16 is a detail view showing the lower part of the clutch actuating mechanism, Fig. 17 is a diagrammatical transverse section of a portion of the machine showing the presser parts in the position they occupy when the bricks are fed into the machine, Figs. 18, 19 and 20 are views similar to Fig. 17 showing the apparatus in different positions, Fig. 21 is a fragmentary diagrammatical longitudinal section showing the position occupied by the end pressers when the side pressers are in the position shown in Fig. 17, Figs. 22, 23 and 24 are views similar to Fig. 21 in which the end pressers correspond to the side pressers in the position shown in Figs. 18, 19 and 20 respectively, Fig. 25 is a detail view showing one of the intermittent gear and locking devices, Fig. 26 is a plan view of the parts shown in Figs. 25 and 27, as assembled, certain of the parts being shown in section, Fig. 27 is a view showing another of the intermittent gears, Fig. 28 is a plan view of a portion of the device showing the pressing members, Fig. 29 is a side view of the apparatus shown in Fig. 28, and Fig. 30 is an end view of the apparatus shown in Fig. 28.

In carrying out my invention I provide a pair of main side frames 1 which are bolted or otherwise secured together by means of cross members 2 (see Fig. 5). Journaled in the side frames in bearings 3 is the shaft 4. On the end of the latter, outside of the main frame members is mounted a friction clutch member 5 arranged to be engaged by a companion clutch member 6. The latter is slidably mounted on a loose sleeve 7 carried by the shaft 4. A collar 8 which is integral with the clutch member 6 is engaged by a lever 9 (see Figs. 13 and 16) this lever being secured to a vertically extending rod 10.

The rod 10 is journaled in bearings 11 (see Figs. 14 and 15) carried by one of the frame members 1. To the rod 10 is secured a lever 12 (see Fig. 15). The latter consists of a pair of arms extending from a central boss and having end bosses 12$^x$. The latter are recessed as shown at 12ʸ in Fig. 15 to receive pins such as those shown at 13. Each pin is normally acted on by a spring 14 in the recess 12ʸ. The movement of the pin is limited by a nut 15 on the shank of the pin.

Referring now to Fig. 13 it will be seen that I have provided a movable bar 16 which is provided with slots 16ᵃ arranged to receive pins 17 carried by the brackets 11ˣ secured to the frame 1. A handle 18 is provided on one side of the machine at the end of the bar 16 and another handle 19 is provided on the opposite side. These handles form means for operating the clutch member 6. To this end the bar 16 is provided with two recesses 16ˣ and 16ʸ respectively, as shown in Figs. 13 and 15. It will be observed that when one of the pins 13 enters one of the recesses the other pin is out of the recess. To operate the clutch one of the handles 18 or 19 is pushed or pulled, thereby giving the bar 16 a longitudinal movement to shift the relative positions of the pins with respect to the recesses 16ˣ and 16ʸ. This will cause a rotary movement of the lever 12 of the rod 10 and the shifting of the lever 9, the collar 8 and the clutch member 6, to throw the latter either into or out of engagement with the companion clutch member 5.

The sleeve 7 upon which the floating part 6 of the clutch slides has an integral pinion 20 (see Figs. 5 and 16). The latter engages a gear 21 mounted on a shaft 22 journaled in the side members 1 of the frame and disposed parallel to the driving shaft 4. The intermittent feed mechanism is operated by the shaft 22. A detail description of the operation of the intermittent feed will be given hereinafter.

Referring now particularly to Figs. 5 to 8, I have shown therein a pair of eccentrics 23 which are keyed to the drive shaft 4. The eccentrics 23 are provided with encircling straps 24 having integral arms 25, the latter being provided with journals 26 at their upper ends in which is disposed a shaft 27. The outer ends of the shaft 27 are fitted into bearings 28 carried by the side members 29 of a slidable frame, which is designed to move vertically in run-ways 30 (see Fig. 8). The top member 31 of this frame is provided with recessed bosses 32 in which are disposed the hubs 33 of the top presser plates 34. Springs 35 disposed in the recess of the bosses press upon the ends of the hubs while bolts 36 are provided for limiting the movement of the plates and for also adjusting their positions. From the construction just described it will be apparent that when the top presser plates 34 engage a brick the pressure on the latter may be regulated by providing a spring 36 of such tension or strength that at a predetermined pressure the plates 34 will yield.

The side members 29 of the slidable frame have laterally extending flanges 37 upon which are mounted upper and lower shafts 38 and 38ˣ respectively. These shafts 38 and 38ˣ form fulcrum members for the lever arms 39 and 39ˣ respectively, both of which are pivotally connected at their ends to the side presser plates 40. Since the axis of the shafts 38 and 38ˣ and of the pivotal connections of the arms 39 and 39ˣ with the plate 40 are the same distance apart the arrangement provides a "parallel movement" for the plates 40. Both of the plates 40 are designed to engage and slide upon the bed plate 41 which is bolted or otherwise secured to the frame members 1. As the vertically slidable frame which carries the shafts 38 and 38ˣ is raised or lowered the plates 40 will engage this bed plate, thereby moving the side presser plates 40 inwardly or outwardly for the purpose of pressing the sides of the brick and of removing the presser plates from the brick. This side movement of the presser plates is automatic and will occur whenever the plates come in contact with the bed plate as in the downward movement of the frame or in the upward movement of the frame when their movements, of course, will be reversed.

Referring again to Fig. 8 it will be seen that I have also provided brackets 42 which are secured to the vertically slidable frame 29, and which form bearings for the shafts 43 and 43ˣ which constitute the fulcrum supports for the end presser plates. These shafts carry arms 44 and 44ˣ (see Fig. 21) which are pivotally secured to the end presser plates 45 in the same manner that the arms 39 and 39ˣ are secured to the side presser plates 40. The operation of the end presser plates is precisely the same as that of the side presser plates, except that the latter will be operated before the former and the operation continues longer, as will be explained later. As will be seen from the drawings, the machine is designed to simultaneously act on two bricks, one on each side of the central partition 46, which extends longitudinally of the device. Disposed loosely on the drive shaft 4 midway between the side members 1 is an eccentric 47 whose strap 48 is pivotally connected by an arm 49 (see Fig. 4) with a shaft 50 carried by a pair of levers 51. The latter are provided with slots 51ˣ so as to permit an adjustment of the shaft 50 toward or away from the pivotal support 52 of the levers 51. Secured to the upper ends of the levers 51 is a shaft 53. Links 54 are loosely mounted on the shaft 53 and are pivotally secured to plates 55 which are disposed on either side of the partition 46, as shown in Fig. 3. These plates 55 are kept constantly in contact with the bed plate by means of spiral springs 56 which are attached at one end to collars 57 on the shaft 53 (see Fig. 2) and at the other end to the hubs of the links 54. The movement of the eccentric 47 causes a reciprocation of the plates 55 so as to push the unformed bricks into position where they will be acted upon by the presser plates.

In Figs. 2, 4, 6, 7 and 8, I have shown a shaft 68, which is journaled in the frame members 1, and which has disposed thereon a spiral spring 58. This spring is shown in detail in Fig. 10. It will be seen that one end of the spring is attached to a lever arm 59 by means of a bolt 60 and the other end is attached to a plate 61 at 62, (see Figs. 11 and 12). Both the lever arm 59 and the plate 61 are mounted to turn freely on the shaft 68. Secured to the shaft 68 is a hub 63 bearing a lever 64, which is provided with a locking pin 65 arranged to enter openings 61$^x$ in the plate 61. A nut 66 is provided for securing the pins 65 in position, thereby locking the lever 64 to the plate 61. The outer end of the lever 64 is pivotally secured to the link 67 (see Figs. 6, 7 and 8) which is pivotally connected with a shaft 27. The latter, it will be recalled, is the means by which the frame bearing the presser plates is raised or lowered. One end of the lever arm 59 rests against a downwardly projecting integral portion 69 on the bed plate 41. It will be apparent that as the frame descends the coil spring 58 is tightened, and this arrangement therefore forms a means for counterbalancing the weight of the vertically slidable frame and of the presser plates and mechanism for operating the latter which is carried by the frame. The tension of the spring may be adjusted by shifting the locking pin 65 to the various openings 61$^x$ in the plate 61.

Secured to the shaft 22 is a sprocket wheel 70, which, through the medium of a sprocket chain 71, drives a sprocket wheel 72 on the shaft 73 of a drum 74. This causes the drum 74 to be revolved continuously with the shaft 22. A belt 75 passes over the drum 74 and over a smaller drum 76 disposed close to the end of the bed plate 41, so that as the bricks are delivered from the bed plate they pass upon the belt or carrier 75, as shown in Fig. 4. The shaft 73 is journaled in bearings 77 which are adjustable in guides 78, adjusting screws 79 being provided for the purpose of moving the bearings. The belt 75 is supported at intervals by means of idlers 80. An adjustable sprocket wheel 81 is secured to a depending bracket 82 for putting the proper tension upon the sprocket chain 71.

Referring now particularly to Figs. 1, 5, 8 and 25 to 27 inclusive I have shown the shaft 4 as being provided with a gear 83 which is arranged to mesh with a gear 84 on the shaft 22. The gear 84 is provided with teeth 84$^x$ on one half of its periphery, a large tooth 84$^y$ being provided for receiving the jar when the gear 84 comes into mesh with the gear 83. One half of the gear 84 is without teeth and this portion is extended laterally as shown at 86. Secured to the gear 83 is a locking member 87 having a curved portion 87$^x$ arranged to engage the member 86. This constitutes a Geneva movement. It will be apparent that the revolution of the shaft 22 will cause the gear 84 to drive the gear 83 as long as the teeth 84$^x$ are in contact and that the gear 83 will thereupon be locked when the member 87 comes in contact with the portion 86. On the same shaft 4 (see Fig. 5) is loosely disposed the eccentric 47, a bearing sleeve 88 of soft metal being provided. Secured to the hub 47$^x$ of the eccentric 47 is a gear 89 which is arranged to be engaged by a gear 90 provided with teeth 90$^x$ on one half of its periphery and having a large tooth 90$^y$ similar to the tooth 84$^y$ of the gear 84. The gear 89 is also provided with a locking member 91 which is similar to the locking member 87 and is arranged to engage a lateral extension 92 on the gear 90 similar to the extension 86 of the gear 84. This Geneva movement is arranged to operate while the other one is locked and vice versa. Figs. 25 and 27 indicate the respective positions of these two Geneva movements at any given time.

From the foregoing description of the various parts of the device the operation thereof may be readily understood. Power is applied to the pulley member 5 and when the clutch member 6 is thrown in the power will be transmitted through the gears 20 and 21 (see Figs. 14 and 16) to the shaft 22. This will cause the revolution of the gears 84 and 90 and as explained before will cause the turning of the gear 89 while the gear 83 is locked and vice versa. The gear 89 drives the eccentric 47, which through the medium of the arm 49 will cause a movement of the plates 55, which force the bricks 93 which have been previously placed on the table 41 toward the central part of the machine where they are to be surfaced. The movements are so timed that the plate 55 which pushes the bricks toward the center is retracted and subsequently the gear 89 is locked by the locking member 91 which engages the surface 92 (see Fig. 27). At the same time the Geneva movement of which the gear 83 is a part is operated, and since the gear 83 is on the shaft 4 (see Fig. 5) the latter is turned, thereby operating the surfacing and pressing plates through the medium of the eccentrics 24, as already explained. Referring again to Figs. 17 to 24 inclusive it will be seen that the side plates 40 are first brought into position for pressing the sides of the brick, the end plates 45 being then brought into position and finally the top plate 34. The order of operation of these plates is reversed. When the side plates 40 have raised sufficiently the plates 55 which push the bricks toward the center of the device are again operated, the attendant having placed new unformed bricks 93 in position. The unformed bricks push out the surfaced bricks upon the belt 75 which conveys them away from the machine to any suitable point.

A device constructed as above produces a brick having a surface free from cracks or checks. It will be apparent that there is no sliding action of the brick on the presser plates. Instead of the sliding action the presser plates come directly upon the brick and are removed directly therefrom and the brick is left with a smooth even surface.

It is essential in the operation of this device that some holding means be provided when the top plate is withdrawn because I have found by experience that with devices in which the side, end, and top plates withdraw simultaneously the clay is apt to stick to the top plate, thereby causing the breaking off of the corner of the brick. When, however, the plates are withdrawn in the order specified above there is no such tendency to break off the corners, for when the top plate is withdrawn the side and end plates are holding the brick. The result is that bricks consisting of material which cannot properly be molded or surfaced with those forms of molds in which the plates are moved simultaneously may be successfully surfaced by the device described above.

I claim:

1. In a machine for pressing brick, a table arranged to receive the plastic brick, means for moving the plastic brick along the table into operative position, means for subsequently compressing the sides of the brick, other means for subsequently compressing the ends of the brick, and additional means for subsequently pressing the top of the brick.

2. In a machine for pressing brick, a table arranged to receive the plastic brick, means for moving the plastic brick along the table into operative position, a stationary and a movable plate for compressing the sides of the brick, a pair of movable plates for compressing the ends of the brick, and a vertically movable plate for pressing the top of the brick.

3. In a machine for pressing brick, a table arranged to receive the plastic brick, means for moving the plastic brick along the table into operative position, a central partition carried by the table, a pair of plates movable toward and away from said central partition for compressing the sides of the brick, movable plates for compressing the ends of the brick, and vertically movable plates for pressing the top of the brick.

4. In a machine for pressing brick, a table arranged to receive the plastic brick, means for moving the plastic brick along the table into operative position, a central partition carried by the table, side plates movable toward and away from said central partition for compressing the sides of the brick, movable end plates for compressing the ends of the brick, vertically movable plates for compressing the top of the brick, means for causing a movement of said side plates into their operative positions and subsequently causing a movement of the end plates into their operative positions, and means for finally causing a movement of the top plates into their operative positions.

5. In a machine for pressing brick, a frame provided with a top or table, a central partition carried by the table, pusher plates normally disposed at one end of the table and slidable thereon, said pusher plates being separated by said central partition and vertically movable frame, means for reciprocating said vertically movable frame, presser plates pivotally connected with said vertically movable frame and arranged to engage said table, the contact of the presser plates with said table serving to move the plates toward the partition, and means for reciprocating said pusher plates toward and away from said vertically slidable frame.

6. In a machine for pressing brick, a frame provided with a top or table, a central partition carried by the table, presser plates normally disposed at one end of the table and slidable thereon, said presser plates being spaced apart to pass on opposite sides of said central partition, a vertically movable frame, means for reciprocating said vertically movable frame, presser plates pivotally connected with said vertically movable frame, and arranged to engage said table, the contact of the presser plate with said table serving to move the plates toward the partition, and means for reciprocating said presser plates toward and away from said vertically movable frame, the reciprocatory movement of the presser plates alternating with reciprocatory movements of the vertically movable frame, and each of the last mentioned members being locked in position while the other is in motion.

7. In a machine for pressing brick, a main frame provided with a top or table, a vertically slidable frame carried by said main frame, an abutment member carried by said table, a side plate pivotally carried by said vertically movable frame and arranged to engage the table, a pair of end plates pivotally carried by said vertically movable frame and arranged to engage the table, the engagement of the side plate with the table serving to force the side plate toward the abutment, and the engagement of the end plates with the table serving to force them toward each other.

8. In a machine for pressing brick, a main frame provided with a top or table, a vertically slidable frame carried by said main frame, an abutment member carried by said table, a side plate pivotally carried by said vertically movable frame and arranged to engage the table, a pair of end plates pivotally carried by said vertically movable frame and arranged to engage the table, the engagement of the side plate with the table serving to force the side plate toward the abutment, the engagement of the end plates with the table serving to force them toward each other, and a top plate carried by said frame and movable toward and away from said table.

9. In a machine for pressing brick, a table, an abutment carried thereby, a frame movable at right angles to the table, a pivoted plate carried by said frame arranged to engage the table in the movement of the latter and to be forced toward the abutment, and means for maintaining the plate parallel with the adjacent side of the abutment.

10. In a machine for pressing brick, a horizontal table, an abutment carried thereby, a vertically movable frame, a presser plate disposed normally parallel with said abutment, a "parallel movement" for pivotally connecting said presser plate with said frame, means for reciprocating the vertically movable frame to bring the presser plate into engagement with the table and to force the latter toward the abutment, a pair of end plates each connected by a parallel movement with the frame and arranged to engage the table in the movement of the frame and to be forced toward each other by said movement.

11. In a machine for pressing brick, a horizontal table, an abutment carried thereby, a vertically movable frame, a presser plate disposed normally parallel with said abutment, a "parallel movement" for pivotally connecting said presser plate with said frame, means for reciprocating the vertically movable frame to bring the presser plate into engagement with the table and to force the latter toward the abutment, a pair of end plates each connected by a parallel movement with the frame and arranged to engage the table in the movement of the frame and to be forced toward each other by said movement, and a spring-pressed top plate carried by said frame and movable therewith toward and away from said table.

12. In a machine for pressing brick, a horizontal table, an abutment carried thereby, a vertically movable frame, a presser plate disposed normally parallel with said abutment, a "parallel movement" for pivotally connecting said presser plate with said frame, means for reciprocating the vertically movable frame to bring the presser plate into engagement with the table and to force the latter toward the abutment, a pair of end plates each connected by a parallel movement with the frame and arranged to engage the table in the movement of the frame and to be forced toward each other by said movement, a spring-pressed top plate carried by said frame and movable therewith toward and away from said table, and means for adjusting the normal position of the top plate.

13. In a machine for pressing brick, a main frame, a table carried thereby, an abutment on said table, a vertically movable frame carried by said main frame, means for counterbalancing said vertically movable frame, a side plate and end plates pivotally carried by said vertically movable frame and arranged to engage said table, a pusher plate slidably disposed on said table, means for reciprocating said pusher plate toward and away from said vertically movable frame, means for reciprocating said vertically movable frame toward and away from said table, the pusher plate being locked in position during the movement of the vertically movable frame, and the latter being locked in position during the movement of the pusher plate.

14. In a machine for pressing brick, a table arranged to receive the plastic brick, means for moving the plastic brick along the table into operative position, means for pressing the sides of the brick, means for subsequently pressing the ends of the brick, means for subsequently pressing the top and bottom of the brick, the pressing members being retracted in reverse order, the movement of an unformed brick into operative position after the retraction of the presser mechanism serving to force the pressed brick out of operative position, and a conveyer for receiving the pressed brick.

CHARLES F. THOMAS.

Witnesses:
ALBERT HARPER,
ARTHUR R. COLBURN.